United States Patent [19]
Jenkins

[11] Patent Number: 5,941,015
[45] Date of Patent: Aug. 24, 1999

[54] MULTIPLE FEATURED FISHING SYSTEM

[76] Inventor: Deward D. Jenkins, 105 Cranwill Dr., Hendersonville, Tenn. 37075

[21] Appl. No.: 08/790,925

[22] Filed: Jan. 29, 1997

[51] Int. Cl.[6] ........................... A01K 97/06; A01K 97/10
[52] U.S. Cl. ............................... 43/54.1; 43/21.2; 43/17.5
[58] Field of Search .................. 43/17.5, 21.2, 43/54.1, 57.1

[56] References Cited

U.S. PATENT DOCUMENTS

| | | |
|---|---|---|
| 1,592,443 | 7/1926 | Comstock . |
| 2,264,744 | 12/1941 | Dunnam ................................... 43/21.2 |
| 2,555,073 | 5/1951 | Zdankoski ................................ 43/21.2 |
| 2,596,403 | 5/1952 | Hoffman .................................. 43/21.2 |
| 2,823,971 | 2/1958 | Hoyt ........................................ 43/54.1 |
| 2,936,066 | 5/1960 | Meksula .................................. 312/324 |
| 3,251,638 | 5/1966 | Schwartz ................................. 43/57.1 |
| 3,546,805 | 12/1970 | Schaeffer ................................. 43/21.2 |
| 3,555,719 | 1/1971 | Butler ....................................... 43/54.1 |
| 4,023,304 | 5/1977 | Singer ...................................... 43/54.1 |
| 4,541,539 | 9/1985 | Matthews ................................. 220/20 |
| 4,697,379 | 10/1987 | McPhaul ................................. 43/54.1 |
| 4,815,593 | 3/1989 | Brown .................................. 206/315.11 |
| 4,841,661 | 6/1989 | Moore ...................................... 43/54.1 |
| 4,953,318 | 9/1990 | Vasseur, Jr. ............................. 43/21.2 |
| 5,054,228 | 10/1991 | Elkins ..................................... 43/21.2 |
| 5,152,494 | 10/1992 | Frunzar ................................... 43/21.2 |
| 5,159,777 | 11/1992 | Gonzalez ................................. 43/54.1 |
| 5,331,761 | 7/1994 | Kuthy ...................................... 43/21.2 |
| 5,333,408 | 8/1994 | Simmons ................................. 43/54.1 |
| 5,375,905 | 12/1994 | Flitter et al. ............................ 43/54.1 |
| 5,414,953 | 5/1995 | Taylor ..................................... 43/21.2 |
| 5,471,779 | 12/1995 | Downey ................................... 43/54.1 |
| 5,611,170 | 3/1997 | McGuff et al. ......................... 43/57.1 |
| 5,685,107 | 11/1997 | Sweet ...................................... 43/21.2 |
| 5,692,335 | 12/1997 | Magnuson ............................... 43/54.1 |

*Primary Examiner*—Michael J. Carone
*Assistant Examiner*—Darren Ark
*Attorney, Agent, or Firm*—Mark J. Patterson; Waddey & Patterson

[57] ABSTRACT

The present invention discloses a multiple featured fishing system. The fishing system typically includes a housing having a tackle box, a securing means for securing the housing to a surface, fishing rod holders, and a tool box. An integral and external handle are both provided. The securing means included the external handle wheel is easily removable and used to secure the unit to the ground. A light is provided facing the rear. Another light is provided facing the front. Adjustable legs are is provided so that the elevation of the entire system can be changed. A reel rest portion is provided with reel notches whereas the rod rest is provided with grooves. Tackle drawers are provided in the front section and a tool drawer is provided in a rear section. A base is provided with multiple holes to allow easy mounting to various fixtures.

2 Claims, 4 Drawing Sheets

MULTIPLE FEATURED FISHING SYSTEM

BACKGROUND OF THE INVENTION

The present invention relates generally to a fishing system and more particularly to a tackle box and rod holder having multiple containers and lights.

It will be appreciated by those skilled in the art that fisherman require several things. Initially, fisherman have traditionally used a rock or other static object to hold their fishing rod and reel in place. Unfortunately, use of a rock or ground can be very dirty and can damage the equipment. To this end, there have been several attempts to provide rod and reel mounting devices. Unfortunately, these devices are either complex such as U.S. Pat. Nos. 3,555,718 and 2,555,073 or lacking in needed features as U.S. Pat. No. 5,331,761. Unfortunately, through these complex systems may provide for elevation and angle adjustment, however, this elevation can easily be changed by the pulling of a fish on the line.

Fishermen also need a light, a tackle box, and a tool box. Fishermen need a handle to carry around these items. Unfortunately, the prior art has failed to combine the necessary features into one system.

What is needed, then, is a multiple feature fishing system. This fishing system must have a method of holding a rod and reel. This system should have at least one light. This system should have a tool box and tackle box or a tool drawer and tackle drawer. This system should have a way of controlling the elevation of the rod and reel. This system must have a way of attaching to a surface. This needed device is presently lacking in the prior art.

SUMMARY OF THE INVENTION

The present invention discloses a multiple featured fishing system. This fishing sytsem includes a housing having a tackle box, a securing means for securing the housing to a surface, and fishing rod holders. The housing includes a front, a rear, an upper typically section and a base, both attached to the front and the rear. The rear typically includes a tool box, and the front typically includes the tackle box. The upper section typically has a rod rest portion close to the front and a rear rest portion close to the rear. An integral handle and an external handle are both provided. In one embodiment the securing means includes a securing handle. The securing handle is used to secure the housing to the ground and is typically removable from the housing. Preferably, the securing handle and the external handle are one in the same. A light is provided facing the rear. Another light is provided facing the front. Adjustable legs are provided so that the elevation of the entire system can be changed. The reel rest portion is provided with reel notches whereas the rod rest is provided with notches. Tackle drawers are provided in the front section and a tool drawer is provided in the rear section. The base is provided with multiple holes to allow easy mounting to various fixtures on a variety of surface including boats.

One object of the present invention is to provide a multiple featured fishing system.

Another object of the present invention is to provide a rearward facing light.

A further object of the present invention is to provide a forward facing light.

A still further object of the present invention is to provide a tackle drawer.

Another object of the present invention is to provide a tool drawer.

A further object of the present invention is to provide a place for holding a rod in place.

Another object of the present invention is to provide a place holding a reel in place.

DESCRIPTION OF THE PREFERRED EMBODIMENT

Figure 1:
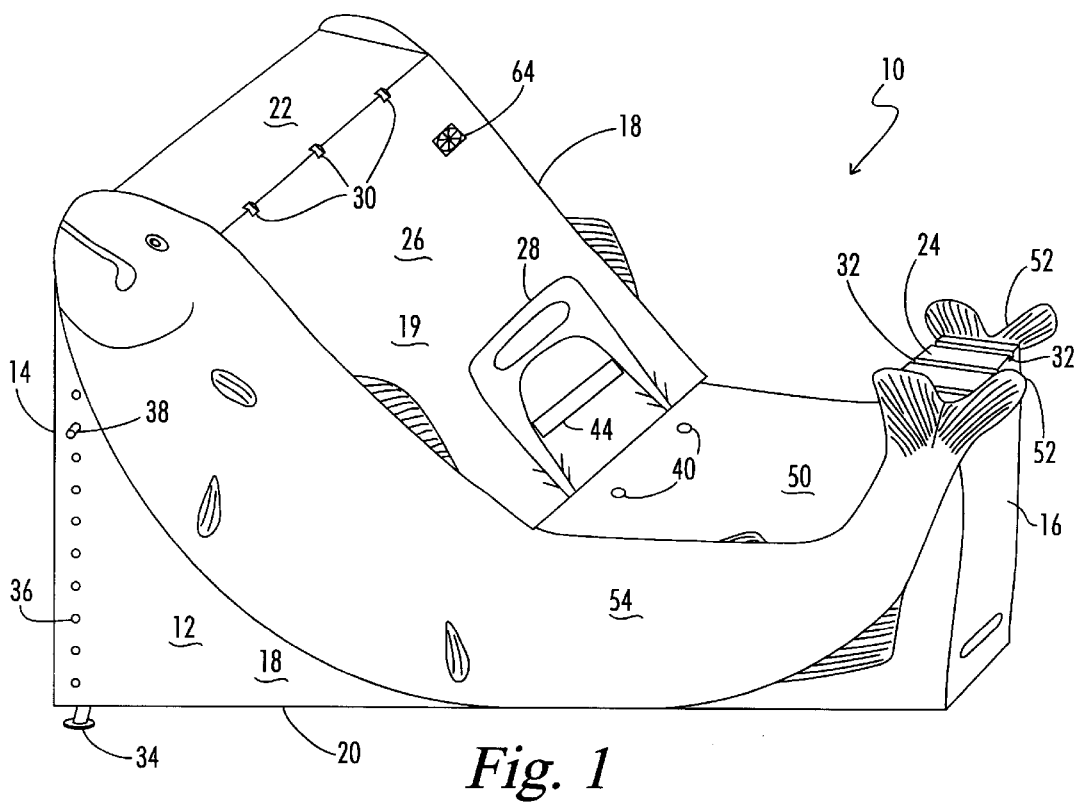
FIG. 1 is a rear perspective view of the system of the present invention.

Applicant's invention will be best understood when considered in light of the following description of the preferred embodiment of the invention, as illustrated in the attached drawings wherein like reference numerals and characters refer to like parts.

Referring now to FIG. 1, there is shown generally at 10 the fishing system of the present invention. Fishing system 10 comprises a housing 12 having a front 14 and a rear 16 joined by sides 18, an upper section 19, and base a 20. Upper section 19 preferably includes a rod rest portion 22 near the front 14 and reel rest a portion 24 near the rear 16. Rod grooves 30 are preferably integral with the to rod rest portion 22 and reel notches 32 are integral with the reel rest portion 24. In one embodiment the rod rest portion 22 and the rest portion 24 are separated by an incline 26 and a ledge 50. Preferably, external handle 28 is releasibly attached to ledge 50 using handle holes 40. and includes a securing means. The securing handle secures the housing into the ground by extending through holes 40 in the upper section 19 and holes 57 in the base 20. Preferably, the base 20 also includes securing means in the form of holes 56 to secure the housing to a variety of surfaces or fixtures, such as boats and piers. In the preferred embodiment, sides 18 can have ornamentation 54 such as the fish shown in FIG. 1. Preferably, adjustable legs 36 are received by housing 12 so that the height and level of or incline system 10 can be adjusted by extending or retracting legs 34 into housing 12. In one embodiment, pins 38 are used to control the adjustment (raising or lowering of the legs). Pins 38 are received by leg adjustment holes 36 to control the amount of leg 34 extending out of housing 12. Preferably, a rear light 44 is located in the incline 26. A rear light switch 64 is provided to activate and deactivate the rear light 44.

Figure 2:
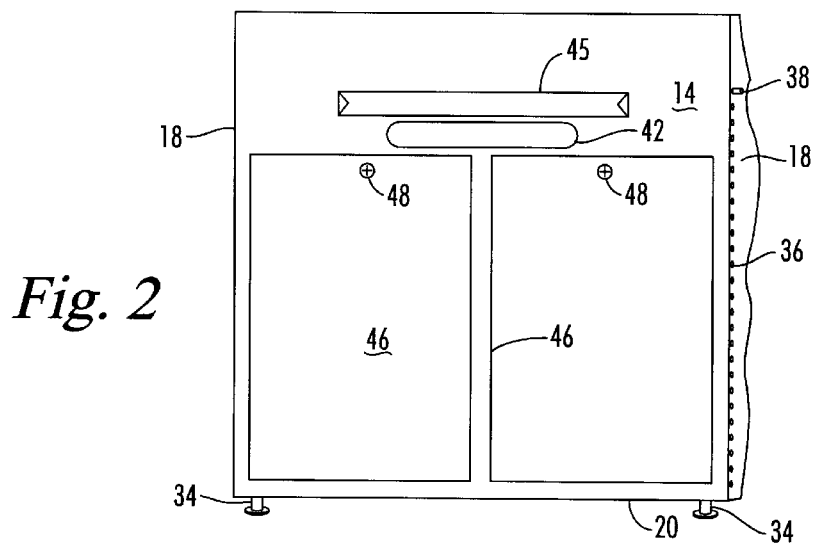
FIG. 2 is a frontal view of the system of the present invention.

Referring now to FIG. 2, other features of fishing system 10 are shown. Tackle box doors 46 are provided at the front 14. The doors 46 are held closed by closure screws 48. An integral handle 42 is placed in housing 12 in the front 14. Front light 45 is attached to housing 12 in the front 14. FIG. 2 also shows a better view of adjustable legs 34 and the method of adjustment using pin 38 in holes 36.

Figure 3:
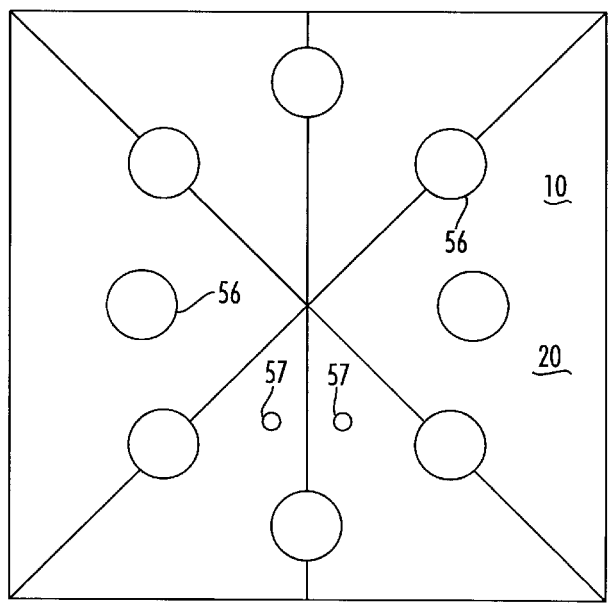
FIG. 3 is a bottom or base, of the view of the present invention.

Referring now to FIG. 3, there is shown the base 20 of the fishing system 10, the present invention. As can be seen, multiple mounting holes 56 are provided for attaching system 10 to fixtures such as boats. Six large holes 56 and two small holes 57 are provided to optimize the number of fixtures to which fishing system 10 can be attached. The holes 57 also receive the handle 28 such that the handle 28 may secure the housing 12 to the ground.

Figure 4:
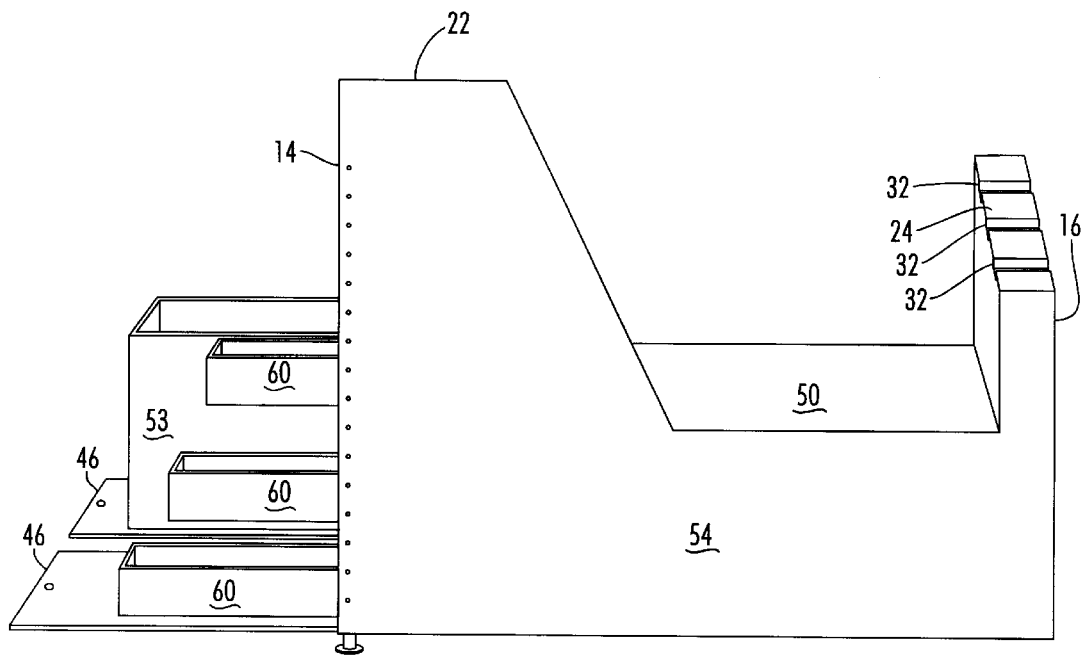
FIG. 4 is a side perspective view of the system of the present invention.

Referring now to FIG. 4, tackle drawers 60 and 53 of the fishing system 10 are shown along with doors 46 in an opened position. Tackle box doors 46 are pivotally attached to housing 12 proximal front 14. Housing 12 slidably receives, large the tackle box 53 and the three small tackle boxes 60. FIG. 4 also shows in greater detail reel rest portion 24 and the attendant reel near rear 16.

Figure 5:
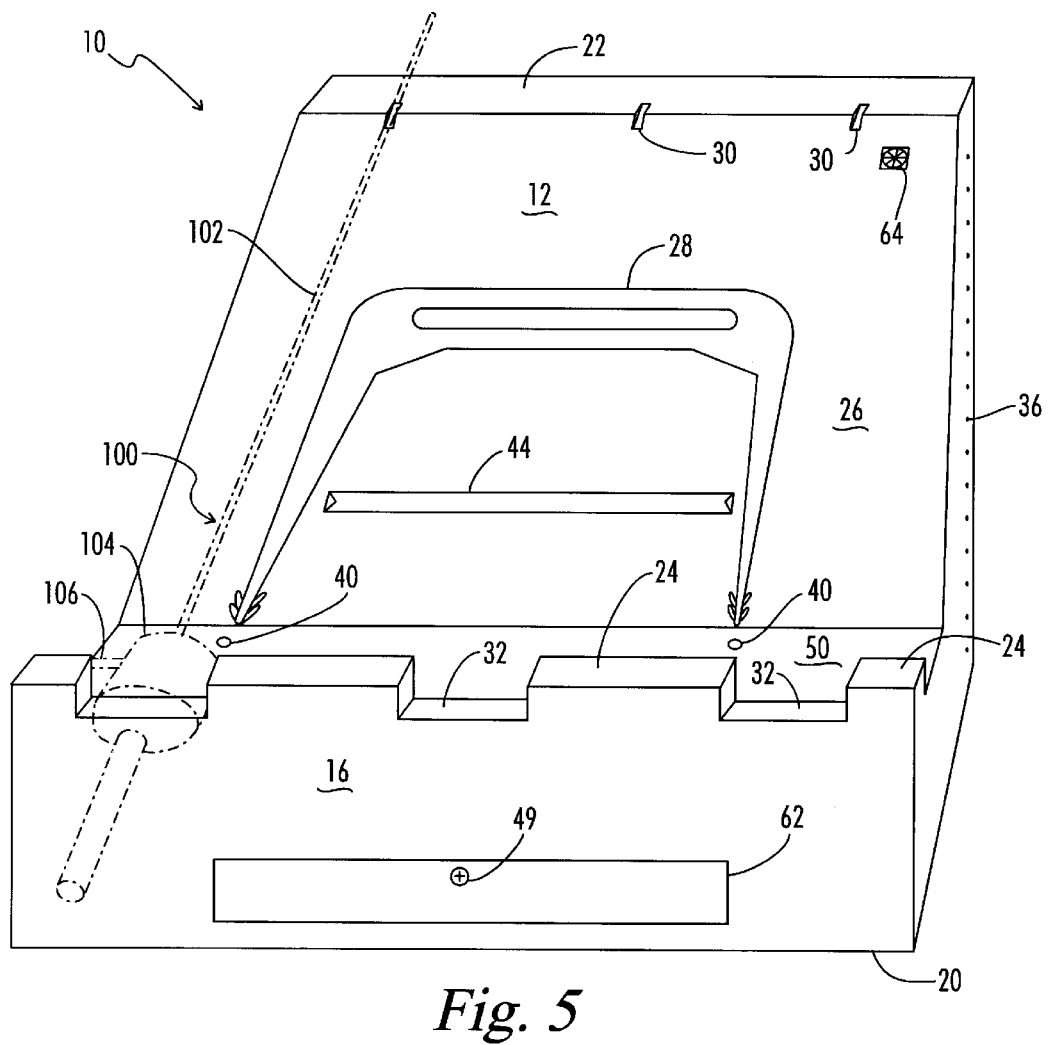
FIG. 5 is a rear view of the system of the present invention.
Figure 6:
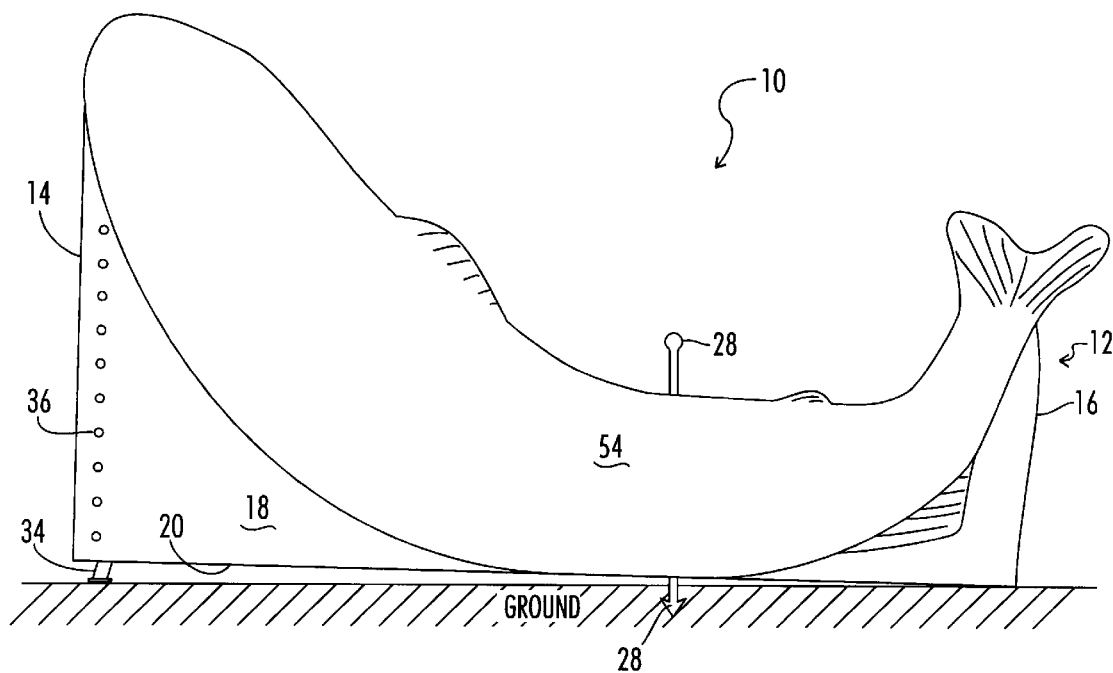
FIG. 6 is a side view showing the securing handle wedged into the ground.

Referring now to FIG. 5, there is shown a rear perspective view of the fishing system 10 of the present invention. Many of the features have already been described. However, FIG. 5 also shown a fishing pole 100 received by fishing system 10. Rod 102 is received by rod grooves 30 whereas reel 104 is received by reel notches or grooves 34. Reel spinner 106 can be seen to contact reel rest portion 24 if necessary to keep it from spinning. FIG. 5 also shows the light switch 64 for rear light 44. Additionally, tool box a 62 which is slidably received by housing 12 proximal, the rear 16 is shown. Closure screw 49 is provided to keep tool box 62 in place.

Preferably, large tackle drawer 58 is 7"×5"×5 ½" whereas three small tackle box drawer 60 are preferably 9"×6"×2". Preferably, tool box 62 is 6"×2"×7".

Additionally, although in FIG. 5, fishing pole 100 is shown in the farthest left rod groove 30 and reel grove 32, fishing pole 100 can be angled so that rod 102 and reel 104 are not in corresponding respective grooves 30 and 32 which allow different horizontal alignment of fishing pole 100.

Thus, although there have been described particular embodiments of the present invention of a new and useful multiple featured fishing system, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A fishing system comprising:
    a. a housing having a front rear, an upper section, and a base;
    b. said upper section having a rod rest portion nearer to said front than said rear;
    c. said upper section further having a reel rest portion nearer to said rear than said front;
    d. a tackle box housed within the housing;
    e. adjustable front legs depending from the front; and
    f. securing means for securing the housing to a surface, wherein, the securing means comprises holes in the upper section; holes in the base; and a securing handle releasibly attached to said upper section, the securing handle insertable through the upper section holes, through the base holes, and into the surface.

2. A fishing system comprising:
    a. a housing having a front, a rear, an upper section, and a base, said front having a intergral handle;
    b. said housing having a rod rest portion proximate said front, the rod rest having a rod groove;
    c. said housing having a reel rest portion proximate said rear, the reel rest having a reel notch;
    d. adjustment means attached to said housing for raising and lowering the front;
    e. a front light attached to said housing proximate said front;
    f. a rear light attached to said housing proximate said rear:
    g. a tool box removably housed in said housing nearer to said rear than to said front;
    h. a tackle box removably housed in said housing nearer to said front than to said rear;
    i. a tackle door pivotally attached to said housing near said front to enclose said tackle box; and
    j. securing means to secure the housing to a surface, wherein the securing means comprises a securing handle insertable through the upper section and the base into the ground.

\* \* \* \* \*